Patented Feb. 14, 1950

2,497,548

UNITED STATES PATENT OFFICE 2,497,548

PREPARATION OF AMINO ALCOHOLS

Vernon E. Haury, Simi, Calif., assignor to Shell Development Company, San Francisco, Calif., a corporation of Delaware No Drawing. Application December 19, 1947, Serial No. 792,847

8 Claims. (Cl. 260—584)

This invention relates to the preparation of amino alcohols, and more particularly to the production of amino alcohols by the catalytic reaction of pyrimidine, or a derivative thereof, with water and hydrogen.

Several methods are known for the preparation of amino alcohol compounds. One of the best of such methods is that described in U. S. Patent No. 2,376,054 and involves treating an alpha, beta-unsaturated ketone with ammonia under conditions providing for the conversion of the ketone to an amino ketone, the latter compound being then converted by hydrogenation into the amino alcohol. This process suffers the disadvantages common to all multi-step preparations, and it is necessary to recover not only the final product but to recover and further treat the intermediate material as well.

It has now been discovered that amino alcohols may be produced by a simple and economical one-step method whereby pyrimidine or a derivative thereof is reacted with water and hydrogen under hydrogenating conditions. The various reactants and reaction conditions necessary to a practice of the process of the present invention will now be more fully described.

The pyrimidine reactant is one having as its essential structure the nucleus

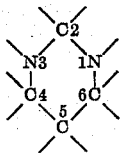

Such compounds are also known as 1,3-diazines.

The term "pyrimidine" as employed herein, is intended to include both pyrimidine itself, a compound having the structure

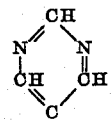

as well as the various derivatives and substituted compounds thereof which also fall into the class of 1,3-diazines. The preferred group of 1,3-diazine reactants comprises pyrimidine itself together with those derivative compounds wherein only hydrogen or hydrocarbyl groups are attached to the free valence bonds on the central nucleus shown above. A more preferred class of reactant compounds is that wherein any free valence bonds of the nucleus not attached to hydrogen are attached to alkyl radicals of the saturated variety. Representative compounds of this more preferred type include 2-methylpyrimidine, 2,5-dimethylpyrimidine, 2,2-dimethyl - 1,2 - dihydropyrimidine, 2,2,4 - trimethyl - 1,2 - dihydropyrimidine, 2,2,4,4 - tetramethyltetrahydropyrimidine, 2,2,4,4,6-pentamethyltetrahydropyrimidine, 2, 2, 4, 4, 6 - pentamethylhexahydropyrimidine, 2, 2, 4, 4, 5, 6 - hexamethyltetrahydropyrimidine, 1, 2, 3, 4, 5, 6 - hexamethylhexahydropyrimidine, 1,2,2,3,4,4,5,5,6,6 - decamethylhexahydropyrimidine, 2-ethylpyrimidine, 2,5-diethylpyrimidine, 2 - methyl-5-ethylpyrimidine, 2,2-diethyl-1,2-dihydropyrimidine, 2,2,4-triethyl - 1,2 - dihydropyrimidine, 2,2,4,4,6 - pentaethyltetrahydropyrimidine, 2,4 - diethyl - 2,4,6 - trimethyltetrahydropyrimidine, 2-propylpyrimidine, 2-isopropylpyrimidine, as well as pyrimidine itself.

The central nucleus may also be substituted by one or more aralkyl radicals, representative compounds being 2,2,4,4,6 - penta - (p - tolylmethyl) - tetrahydropyrimidine
2,2,4,4,6-pentabenzyltetrahydropyrimidine
2-benzylpyrimidine
2,5-dinaphthylmethyl-1,2-dihydropyrimidine or by alkaryl radicals, representative compounds being 2,2,4,4,6-penta-(p-tolyl)-tetrahydropyrimidine
2,2,4-tri-(p-ethylphenyl)-1,2-dihydropyrimidine
2,5 - di - [2 - (7 - methylnaphthyl)] - 1,2 - dihydropyrimidine
4-(m-propylphenyl) pyrimidine or by aryl radicals, representative compounds being 2,2,4,4,6-pentaphenyltetrahydropyrimidine
5-phenylpyrimidine
2-naphthylpyrimidine
2,2,5-trimethyl-3-phenyl-1,2-dihydropyrimidine or by cyclo-paraffinic or cyclo-aliphatic hydrocarbon radicals, representative compounds being 2,2,4,4,6-pentacyclopentyltetrahydropyrimidine
5-(2-methylcyclopentyl) pyrimidine
2,2 - dimethyl - 4 - cyclohexyl - 1,2 - dihydropyrimidine
2,2 - dimethyl - 4,4,6 - tri - (3 - ethylcyclohexyl) - tetrahydropyrimidine It will be appreciated that in general the free valences of the carbon atoms not adjacent to nitrogen atoms in the central 1,3-diazine nucleus of the reactant compounds may be satisfied by substituent groups such as halogen, nitro, carbonitrile, carbaloxy, sulfone and similar groups. Preferably, however, as stated above, the reactant compounds have only hydrogen or hydrocarbyl groups attached to any free valences in the nucleus.

The 1,3-diazine reactant may be obtained from any conventional source. Thus, for example, pyrimidine itself may be prepared by reacting barbituric acid with phosphorus oxychloride and subjecting the resulting chlorinated derivative to the action of zinc dust and water. Another preferred reactant, 2,2,4,4,6-pentamethyltetrahydropyrimidine, may be prepared by reacting acetone and ammonia according to the following equation:

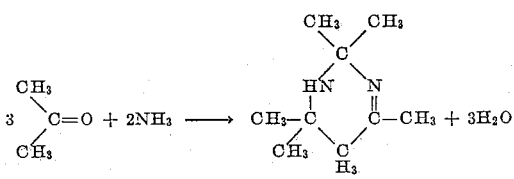

acetone+ammonia→2,2,4,4,6 - pentamethyltetrahydropyrimidine+water

Strong mineral acids, zinc chloride, ferric chloride, ammonium chloride, ammonium nitrate, etc., are effective as catalysts for this reaction. After sufficient time for the reaction has been allowed, the desired 2,2,4,4,6-pentamethyltetrahydropyrimidine may be separated in good yields, usually substantially above 90%, from the reaction mixture by distillation, the distillate collected between about 168° C. to 171° C. at atmospheric pressure giving excellent results in the process of the present invention. Other methods for preparing 1,3-diazines suitable for use in the present invention may be employed, the particular method chosen depending upon the reactant desired.

The other reactants, water and hydrogen, are readily available materials and need not be further described.

The process of the present invention may be represented by the following general equation:

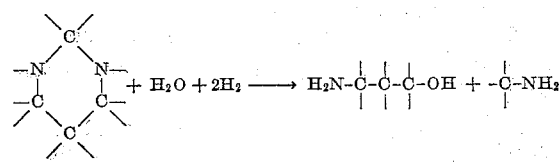

It is thus seen that the amino alcohols obtained by a practice of the present invention have a structure wherein the amino group and the hydroxyl group are separated by 3 carbon atoms. As a specific example, the reaction of 2,2,4,4,6-pentamethyltetrahydropyrimidine with water and hydrogen may be represented by the following equation, where diacetone alkamine and isopropylamine are the reaction products:

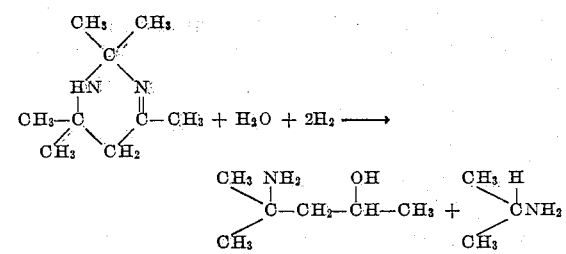

Pyrimidine itself reacts with water and hydrogen in a manner which is believed to accord with the following equation:

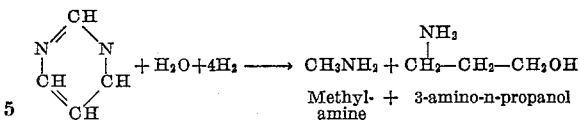

Methyl- + 3-amino-n-propanol
amine

As to the ratio of the reactants, good results are obtained when the mol ratio of water to the 1,3-diazine reactant is at least about 1:1, though smaller or larger ratios may be used. A mol ratio of substantially one gives excellent results, and from 1 to 5 mols of water per mol of 1,3-diazine reactant is the preferred range. The hydrogen reactant is preferably employed in excess.

While the reaction of this invention may be practiced without using any catalyst, the employment of a suitable material of this type is preferred since it greatly improves the yield of the desired amino alcohol product. Any material which is active as a hydrogenation-dehydrogenation catalyst (which materials are commonly referred to in the art as "hydrogenation catalysts") may be used in accordance with the process of the invention. Suitable hydrogenation catalysts include such materials as finely divided nickel, nickel-on-kieselguhr, nickel-on-pumice, colloidal platinum, finely divided palladium, metallic chromium, alumina, iron oxide-chromium oxide compositions, copper oxide-chromium oxide compositions, and the like. A preferred group of catalysts comprises the metal hydrogenation catalysts such as active nickel of the so-called "Raney nickel" type. The catalyst may be used in any suitable amount, the amount used being dependent upon the nature of the catalyst, the character of the reactant material, the operating conditions of the reaction, etc. In general, however, an amount of catalyst ranging between about 0.5% and about 10%, based on the weight of the 1,3-diazine reactant compound, represents a suitable amount when carrying out the process in the liquid phase in a batch manner. In continuous methods of operation, a sufficient amount of catalyst should be used to secure the desired conversion within the contact time employed.

The temperature to be employed is somewhat variable depending upon the nature of the starting material and the other operating conditions, but, in general, will be between about 75° C. and 300° C. When carrying out the reaction in the liquid phase the preferred temperature range is between 100° C. and 150° C. When operating in the vapor phase somewhat higher temperatures, as 150° C. to 250° C., are advantageously employed.

The reaction is carried out at elevated pressures of between 500 and 1500 p. s. i, though a preferred pressure range is from 800 to 1200 p. s. i.

The reaction time may be varied to suit the needs of each particular reaction. In general, satisfactory completion of the reaction may be obtained in from about one-half to ten hours.

The reaction may be effected in any suitable manner, either batch-wise, intermittently or continuously. In the case of batchwise operation, the 1,3-diazine and water reactants, together with the catalyst, may be introduced into a suitable vessel designed to withstand the pressures employed and preferably provided with stirring means. Hydrogen may then be introduced in such an amount as to provide the desired pressure within the vessel at the reaction temperatures to be employed. The vessel may then be brought to the desired operating temperature and there maintained for the reaction interval, with further quantities of hydrogen being introduced, if necessary, to maintain a constant pressure within the vessel. The reaction is deemed to be complete when there is no further appreciable absorption of the hydrogen reactant. In the case of continuous operation, streams of the various reactants in the gaseous or liquid state, and mixed in the proper proportions, may be passed through a suitable catalyst under the desired conditions of temperature and pressure. Other physical means of effecting the reaction may be employed, as will be apparent to those skilled in the art.

The catalytic process described above usually yields a number of by-products in addition to the desired amino alcohol compound. In the case of the 2,2,4,4,6-pentamethyltetrahydropyrimidine reactant, the main by-products are isopropylamine, 2-amino-4-methylpentane, tetramethylpiperidine, diacetonediamine and various ketone and alcohol derivatives of propane and hexane. Separation of the diacetone alkamine from such by-products may be effected by first subjecting the reacted mixture to steam distillation to separate in azeotropic form any water-insolubles and products only slightly soluble in water. The diacetone alkamine is thereafter recovered from the residual mixture by conventional distillation methods, the diacetone alkamine portion being that which boils at 178° C. to 181° C. at atmospheric pressure.

The 1,3-diazine reactants employed in carrying out the process of this invention are normally water soluble and for that reason no solvent other than the water reactant need be employed. If desired, however, a non-aqueous organic solvent medium may also be used. Representative materials of this type are the relatively high boiling alcohols and ethers.

The amino alcohols prepared according to the process of the present invention have many uses. For example, they are useful in compounding surface-active agents, the salts obtained on reaction with higher fatty acids being particularly useful compounds. The amino alcohols are also useful in the preparation of resinous materials and for other purposes.

The following examples serve to illustrate preferred embodiments of the invention:

Example I

Approximately 25 grams of finely divided metallic (Raney) nickel catalyst, along with 6.52 mols of 2,2,4,4,6-pentamethyltetrahydropyrimidine and 7 mols of water were introduced into a two-liter autoclave fitted with stirring means and arranged to be heated by steam. Hydrogen was then added to raise the pressure to about 500 p. s. i. at room temperature, and the charged autoclave was then rapidly heated to a temperature between 120° C. and 140° C. At this temperature the pressure within the vessel was 1000 p. s. i. Heating was continued for a period of two hours, with hydrogen being added from time to time to maintain the pressure within the vessel during the heating interval. At the end of this time the pressure within the autoclave was released and the reaction product was withdrawn and diluted with 250 grams of water, the added water aiding in the separation of the tetramethylpiperidine by forming an azeotrope therewith. The diluted product was then steam distilled, followed by the conventional fractional distillation. The yield of 2.31 mols of diacetone alkamine was recovered as the fraction boiling at 178° C. to 181° C. The isopropyl amine formed during the reaction was removed during the steam distillation step.

Example II

Employing the technique described in Example I above, 6.56 mols of 2,2,4,4,6-pentamethyltetrahydropyrimidine were reacted with 14 mols of water. In this case the yield of diacetone alkamine was 2.48 mols.

Example III

A mixture of 2,4,5,6-tetramethyl-2,4-diethyltetrahydropyrimidine and 2,4-dimethyl-2,4,6-triethyltetrahydropyrimidine was prepared by condensing methyl ethyl ketone and ammonia. By the reaction of this reaction mixture with water and hydrogen under the same conditions as described in Example I above, there are obtained 3,4-dimethyl-2-hydroxy-4-aminohexane and 3-hydroxy-5-methyl-5-aminohexane.

Example IV

By the reaction of 2-benzylpyrimidine with hydrogen and water under the same conditions described in Example I, there is obtained 3-aminopropanol (boiling point 185° C. to 186° C.).

Example V

By reacting 2,2,4-tri-(p-ethylphenyl)-1,2-dihydropyrimidine with water and hydrogen under reaction conditions similar to those described in Example I, there is obtained 3-amino-3-(p-ethylphenyl)propanol.

Example VI

On reacting 2,2,5-trimethyl-3-phenyl-1,2-dihydropyrimidine with water and hydrogen under the elevated conditions of temperature and pressure described in Example I, there is obtained 2-methyl-N-phenyl-3-aminopropanol.

Example VII

When 5-(2-methylcyclopentyl)pyrimidine is reacted at elevated temperature and pressure with water and hydrogen, there is obtained the amino alcohol product 3-amino-2-(2-methylcyclopentyl)-propanol.

Example VIII

When pyrimidine is reacted with water and hydrogen under the conditions of Example I, there is obtained as the amino alcohol product, 3-aminopropanol.

I claim as my invention:

1. The process for the preparation of diacetone alkamine which comprises reacting with hydrogen a mixture made up in the ratio of one mol of 2,2,4,4,6 - pentamethyltetrahydropyrimidine for every one to five mols of water, the reaction being conducted at a pressure of from 800 to 1200 pounds per square inch and at a temperature of from 100° C. to 150° C., and in the presence of a Raney nickel catalyst, the diacetone alkamine being separated from the resulting reaction product.

2. The process for the preparation of diacetone alkamine which comprises reacting with hydrogen a mixture containing at least one mol of water for each mol of 2,2,4,4,6-pentamethyltetrahydropyrimidine, the reaction being conducted at a pressure of from 500 to 1500 pounds per square inch, at a temperature of from 75° C. to 300° C., and in the presence of a metal hydrogenation catalyst, the diacetone alkamine being separated from the resulting reaction product.

3. The process for the preparation of diacetone alkamine which comprises reacting a mixture of 2,2,4,4,6-pentamethyltetrahydropyrimidine, water and hydrogen at a pressure of from 500 to 1500 pounds per square inch, at a temperature of from 75° C. to 300° C., and in the presence of a hydrogenation catalyst, the diacetone alkamine being separated from the resulting reaction product.

4. The process for preparing 3-amino-N-propanol which comprises reacting pyrimidine with water and hydrogen in the presence of a hydrogenation catalyst and at a pressure of from 500 to 1500 pounds per square inch and at a temperature of from 75° C. to 300° C.

5. The process for the preparation of an amino alcohol which comprises reacting with hydrogen a mixture made up in the ratio of one mol of a 1,3-diazine reactant for every one to five mols of water, said 1,3-diazine reactant having attached to its nuclear atoms only members of the class consisting of hydrogen atoms and hydrocarbon radicals, the reaction being conducted at a pressure of from 800 to 1200 pounds per square inch, at a temperature of from 100° C. to 150° C., and in the presence of a Raney nickel catalyst, the amino alcohol being separated from the resulting reaction product.

6. The process for the preparation of an amino alcohol which comprises reacting with hydrogen a mixture containing at least one mol of water for each mol of a 1,3-diazine reactant having attached to its nuclear atoms only members of the class consisting of hydrogen atoms and hydrocarbon radicals, the reaction being conducted at a pressure of from 500 to 1500 pounds per square inch, at a temperature of from 75° C. to 300° C., and in the presence of a metal hydrogenation catalyst, the amino alcohol being separated from the resulting reaction product.

7. The process for the preparation of an amino alcohol which comprises reacting with hydrogen a mixture of a 1,3-diazine reactant and water, said 1,3-diazine reactant having attached to its nuclear atoms only members of the class consisting of hydrogen atoms and hydrocarbon radicals, the reaction being conducted at a pressure of from 500 to 1500 pounds per square inch, at a temperature of from 75° C. to 300° C., and in the presence of a hydrogenation catalyst, the amino alcohol being separated from the resulting reaction product.

8. A process for producing amino alcohols which comprises reacting water, hydrogen and a 1,3-diazine having attached to its nuclear atoms only members of the class consisting of hydrogen atoms and hydrocarbon radicals, said reaction being conducted in the presence of a hydrogenation catalyst at a pressure of from 500 to 1500 pounds per square inch and at a temperature of from 75° C to 300° C.

VERNON E. HAURY.

No references cited.